US009485745B2

(12) United States Patent
Kurby et al.

(10) Patent No.: US 9,485,745 B2
(45) Date of Patent: Nov. 1, 2016

(54) INDOOR LOCATION USING A PACKET SYNCHRONIZED RECEIVER ARRAY

(71) Applicant: iPosi, Inc., Denver, CO (US)

(72) Inventors: Chris Kurby, Denver, CO (US); Richard M. Lee, Denver, CO (US)

(73) Assignee: iPosi, Inc., Denver, CO (US)

( * ) Notice: Subject to any disclaimer, the term of this patent is extended or adjusted under 35 U.S.C. 154(b) by 0 days.

(21) Appl. No.: 14/213,206

(22) Filed: Mar. 14, 2014

(65) Prior Publication Data

US 2014/0370912 A1     Dec. 18, 2014

Related U.S. Application Data

(60) Provisional application No. 61/790,766, filed on Mar. 15, 2013.

(51) Int. Cl.
| | | |
|---|---|---|
| *H04W 64/00* | (2009.01) | |
| *G01S 5/08* | (2006.01) | |
| *G01S 5/10* | (2006.01) | |
| *G01S 5/14* | (2006.01) | |
| *H04W 56/00* | (2009.01) | |
| *G01S 5/02* | (2010.01) | |

(52) U.S. Cl.
CPC ............ *H04W 64/00* (2013.01); *G01S 5/0221* (2013.01); *G01S 5/08* (2013.01); *G01S 5/10* (2013.01); *G01S 5/145* (2013.01); *H04W 56/00* (2013.01)

(58) Field of Classification Search
CPC .......... G01S 5/06; G01S 5/0221; G01S 5/08; G01S 5/10; G01S 5/145; G01S 5/30; G01S 13/874; H04W 56/00; H04W 64/00; H04W 56/001; H04W 56/002; H04W 56/004; H04W 16/20
See application file for complete search history.

(56) References Cited

U.S. PATENT DOCUMENTS

| | | | |
|---|---|---|---|
| 5,119,104 A | 6/1992 | Heller | |
| 5,905,461 A * | 5/1999 | Neher | 342/357.54 |
| 5,920,287 A * | 7/1999 | Belcher | G01S 5/021 342/450 |
| 6,711,590 B1 * | 3/2004 | Lennon | |

(Continued)

FOREIGN PATENT DOCUMENTS

EP     2363723 A1 *   9/2011

OTHER PUBLICATIONS

Notification of Transmittal of the International Search Report and the Written Opinion of the International Searching Authority, or the Declaration, Mailing Date Jul. 18, 2014, pp. 1-12, PCT/US2014/028840.

*Primary Examiner* — Meless Zewdu
(74) *Attorney, Agent, or Firm* — Marsh Fischmann & Breyfogle LLP (57) ABSTRACT

Location of one or more devices in a monitored environment based at least in part on data communications between a device and a communication array disposed relative to the monitored environment. The communication array may include a plurality of nodes, at least two of which may be in operative communication with a mobile device. The plurality of nodes may be synchronized to a common time base with communications over a packet-switched communication network (e.g., employing IP communications or the like). In turn, communications between nodes of known location and a device may be used to determine ranging values at least in part based on characteristics (e.g., time of flight) of the communication. As such, a location may be determined by, for example, multilateration of a plurality of ranging values.

33 Claims, 9 Drawing Sheets

(56) References Cited

U.S. PATENT DOCUMENTS

| | | |
|---|---|---|
| 6,958,677 B1 | 10/2005 | Carter |
| 7,773,624 B2* | 8/2010 | Rao et al. .................... 370/422 |
| 8,139,945 B1 | 3/2012 | Amir et al. |
| 8,886,210 B1* | 11/2014 | Sugar .................. H04W 64/00 455/456.1 |
| 2006/0173612 A1* | 8/2006 | Steel ............................ 701/207 |
| 2008/0100498 A1 | 5/2008 | Fullerton et al. |
| 2008/0161015 A1* | 7/2008 | Maloney et al. .......... 455/456.1 |
| 2011/0050501 A1* | 3/2011 | Aljadeff ....................... 342/387 |
| 2011/0156957 A1* | 6/2011 | Waite ................... G01S 5/0221 342/450 |
| 2011/0250904 A1* | 10/2011 | Valletta et al. ............ 455/456.1 |
| 2012/0026041 A1* | 2/2012 | Murdock .............. G01S 5/0289 342/387 |
| 2012/0142268 A1* | 6/2012 | Tao et al. ..................... 455/3.05 |
| 2013/0242911 A1* | 9/2013 | Heo et al. ..................... 370/329 |
| 2014/0059695 A1* | 2/2014 | Parecki .................. G06F 21/60 726/26 |

\* cited by examiner

FIG. 9

INDOOR LOCATION USING A PACKET SYNCHRONIZED RECEIVER ARRAY

RELATED APPLICATIONS

This application claims priority to U.S. Patent Application No. 61/790,766 filed on Mar. 15, 2013 entitled "INDOOR LOCATION USING TIME DIFFERENCE OF ARRIVAL USING ARRAY-PROCESSED SHORT RANGE RADIO COMMUNICATION SIGNALS", the entirety of which is incorporated by reference herein.

BACKGROUND

Conventional methods of determining a location of a mobile device that include the use of time difference of arrival ("TDOA") have been proposed. However, such methods impose limits on performance and/or fail to capture accurate performance when used within indoor environments. The limitations on performance of such proposed methods are due to limits on signal resolution, transmission signal multipath impact, and limited effective sensitivity given lack of capability to resolve target signals.

Accordingly, such proposed methods are limited to tracking only a few devices at once and may lack ability to continuously track mobiles even though several hundred devices may operate within a targeted interior area of interest. Furthermore, proposed mobile systems that measure the time differences of arrival among surrounding mobile uplink signals require special Location Measurement Unit ("LMU") receivers. Such LMU receivers are installed as an "overlay" to existing communication networks. That is, the LMU receivers operate as a separate network of widely distributed receivers located on cell towers or rooftops that are separate from the communication network to which the mobile device belongs. These cellular network LMUs are designed to detect and demodulate individual mobile devices operating across relatively wide, outdoor geographic areas. These receiver devices are relatively expensive to produce and maintain, and are only approaching economic practicality where they cover relatively large outdoor coverage areas covering potentially thousands of mobiles and are primarily motivated by compliance with mobile E911 mandates or for relatively special national security areas.

The Third Generation Partnership Project ("3GPP") standards body has developed standards for forthcoming releases of the Long Term Evolution protocol ("LTE") that provide a specially embedded Position Reference Signal ("PRS") on the downlink and Sounding Reference Signal ("SRS") on the uplink which along with other features are purported to enable high precision TDOA measurements. However, the 3GPP LTE standard using PRS and SRS does not prescribe a particular method of PRS or SRS processing, detection, system configuration, or method of measurement. The standard only requires the mobile and base station generate the PRS or SRS in a prescribed fashion to allow different vendors' innovations. Also it's important to note that the presence of PRS or SRS signals do not upset compatibility with earlier LTE standard released equipment. Earlier LTE standards-based mobiles may therefore be located using the same method but with less precision than the later releases of the protocol. Similar uplink and downlink signal range measurement methods exist for later version WiFi 802.11 standards.

The motive for long range path measurements is to estimate mobile device location, and historically have been developed using either base to mobile (downlink) or mobile to base station (uplink) communication signals as a physical path sounding resource. Wide-area, macrocellular techniques are established, but in most cases mobile operators or their clients rely primarily on alternative position determination methods, especially those that are GPS based. These methods are useful but are also imprecise. For instance, GPS and assisted-GPS (A-GPS) may be useful outdoors or in lightly obscured environments. A-GPS has been successfully augmented using alternative Global Navigation Satellite Services (GNSS) constellations and associated signals, or are combined with less precise terrestrial Cell ID, WiFi or other macrocellular proximity or range measurements. However, these method still lack sufficient accuracy, resolution or coverage indoor not to mention are slow in terms of time to fix for useful mobile position measurements inside typical buildings.

Mobile cellular "hybrid" position measurements (these include some or all of cell ID, cell sector, A-FLT or database retrieval of estimated access point positions based on geotagged or crowd-sourced WiFi beacons) uncertainties normally exceed the size of most building floors, thus providing an insufficient level of accuracy to locate a mobile device in a building. These methods also lose effectiveness where there are many mobiles to be located at once or require sub-second mobile location updates (or continuous location tracking).

SUMMARY

In view of the foregoing, the present disclosure is related to the use of communication between a device and a communication array to locate a device relative to the communication array. Specifically, the communication array may include a plurality of nodes distributed within a monitored environment that are synchronized by a central hub. The central hub may be in communication with the communication nodes of the communication array by one or more packet-switched data networks (e.g., using internet protocol (IP) such as TCP/IP). In turn, the synchronized communication nodes may be in operative communication with a device in the monitored environment to exchange a data communication. The data communication (e.g., characteristics regarding the data communication) may in turn be used to locate the device in the monitored environment.

In this regard, the subject matter of the present disclosure may have particular applicability in the context of a monitored environment with limited reception of satellite signals such that locating devices within the monitored environment may be limited. For example, the subject matter of the present disclosure may be particularly useful, but not limited to, use in an indoor environment to locate one or more mobile devices. Accordingly, it may be appreciated the location of a mobile device in a monitored environment with limited reception capability for GNSS signals (e.g., an indoor environment) may be particularly useful in a number of different contexts. For example, location determination for emergency calls placed within the monitored environment, use of location determination for location based analytics within an indoor environment (e.g., retail analytics in a large indoor shopping mall), and location based services provided within an indoor environment (e.g., location based advertising within a large indoor convention hall or the like) may all be facilitated utilizing the subject matter presented herein.

A first aspect includes a system for determining a location of a mobile device in a monitored environment. The system may include a plurality of communication nodes distributed within the monitored environment that define a communication array. Each communication node in the communication array may be in operative communication with at least one mobile device for communication of a data communication between the communication array and the mobile device. The system may also include a central hub in operative communication with the communication array by way of a packet switched communication network. In turn, the central hub may provide a synchronization communication to the communication array over the packet switched communication network including information for synchronization of each of the plurality of communication nodes of the communication array to a common time base. The system further includes. A location determination module that is operative to determine a location of the mobile device within the monitored environment relative to the communication array using at least the common time base and the data communication.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example and in an embodiment, the location determination module may be operative to determine the location of the mobile device within the monitored environment relative to the communication nodes using at least the common time base and a characteristic derived from the data communication. The characteristic derived from the data communication may be at least one of a time of arrival, an angle of arrival, a time difference of arrival, a radiofrequency phase of arrival, or some other appropriate signal or signal characteristic that may assist in providing a location of the device. The data communication comprises an identifier corresponding to a source from which the data communication is sent. In this regard, the identifier may correspond to a communication node from which the data communication was sent or may correspond to a mobile device from which the communication was sent.

In an embodiment, the data communication may be a downlink communication and the source may be a communication node. Alternatively, the data communication may include an uplink communication and the source may be the mobile device. Further still, a system may employ both an uplink and a downlink communication (e.g., in an iterative manner) to determine the location of the mobile device.

In an embodiment, the location determination module may be operative to calculate a plurality of ranging values corresponding to a measured distance between the mobile device and each respective communication node. The ranging value may be at least partially based on a measured time of flight of the data communication between a communication node and the mobile device. Alternatively or additionally, the ranging value may be at least partially based on other characteristics of the data communication such as, for example, an amplitude (e.g., of a reference signal in the data communication), an RF phase of the data communication when received, etc.

The location determination module may be operative to calculate a position of the mobile device relative to the communication array based on the plurality of ranging values relative to known locations of a corresponding plurality of communication nodes in the communication array. In this regard, the location determination module may include (e.g., have stored therein or operative to access) known locations for each of the plurality of communication nodes. In this regard, the location determination module may be at a location remote from the mobile device. For instance, the central hub may include the location determination module. That is, the same module that is operative to synchronize the communication nodes may also process the data communications to resolve a device location. Alternatively, the location determination module may be remote from the central hub and/or mobile device. In an embodiment, the mobile device may include the location determination module. In this context, the mobile device may be operative to communicate the position of the mobile device to the central hub.

In the context where the location determination module is disposed at the central hub, each communication array may be operative to time stamp the receipt of the uplink communication from the mobile device relative to the common time base and communicate the time stamp and the identifier to the central hub. Thus, the time stamp in relation to the common time base may allow for calculation of a time of flight of the data communication between the mobile device and the communication node. Accordingly, the location determination module at the central hub may be operative to determine a pseudorange between the mobile device and each communication array at least partially based on the time stamp relative to the common time base and location information for the respective communication array.

The communication array may be in operative communication with the central hub in any manner known in the art. For instance, the communication array may include at least one first node of a first local area network (LAN) and at least a second communication node of a second LAN, wherein the first LAN is different than the second LAN. Thus, the central hub may be in communication with the at least one first node and the at least one second node by way of a wide area network.

In an embodiment, the data communication may include network communication data independent of any specific location determination information. That is, the data communication may include a data payload unrelated to location determination. Additionally, the data communication may include a reference signal. The reference signal may be a proprietary reference signal or may comprise a sounding reference signal (SRS). In either regard, the location determination module may be operable to analyze the reference signal to discriminate valid signals corresponding to the data communication from invalid signals not corresponding to the data communication (e.g., corresponding to a signal originating from outside the monitored environment, resulting from a signal echo, resulting form multipath effects, or the like).

In an embodiment, the plurality of communication nodes may be physically distributed throughout the monitored environment. Thus, the monitored environment corresponds to an area of overlapping communicability of the communication nodes. The monitored environment may be an indoor or partially indoor space. Thus, the monitored environment may have limited satellite visibility, thus preventing useful acquisition of sufficient satellite reception to acquire a location using GNSS or the like. However, the system may include a GNSS receiver operative to provide a location reference for the system. In this regard, the GNSS receiver provides a GNSS time reference to the central hub. Thus, the central hub may be possible to provide a coarse location estimate relative to a GNSS coordinate system. Furthermore, the common time base comprises the GNSS time reference.

In other embodiments, the common time base may be independent of any external time reference.

In an embodiment, the plurality of communication arrays may be disposed in known locations in the indoor environment relative to a descriptor regarding the indoor environment. As such, the location of the mobile device is resolved in relation to the descriptor. For example, the descriptor may include at least one of a map, floor plan, or georeference data.

A second aspect includes a method for determining a location of a mobile device in a monitored environment. The method may include synchronizing a plurality of communication nodes to a central time base maintained at a central hub. The plurality of communication nodes may be distributed within the monitored environment and collectively define a communication array. The method may further include communicating a data communication between the communication array and the mobile device and determining a location of the mobile device within the monitored environment using at least the common time base and the data communication.

A number of feature refinements and additional features are applicable to the second aspect. These feature refinements and additional features may be used individually or in any combination. As such, each of the following features that will be discussed may be, but are not required to be, used with any other feature or combination of features of the second aspect.

In an embodiment, the method may include measuring a characteristic of the data communication. The characteristic may include at least one of a time of arrival, an angle of arrival, a time difference of arrival, an RF phase of arrival, or some other measured characteristic that may assist in resolving or improving location determination of the device. Thus, the determining may include determining the location of the mobile device within the monitored environment using the common time base and the characteristic of the data communication. For example, the determining may include calculating a plurality of ranging values corresponding to corresponding distances between respective ones of the plurality of communication nodes and the device. The determining may also include multilateration using the plurality of ranging values.

In an embodiment, the data communication may be a downlink communication, and the communicating may include sending the downlink communication from the plurality of communication nodes to the mobile device. In another embodiment, the data communication may include an uplink communication, and the communicating may include sending the uplink communication from the mobile device to the plurality of communication nodes. In still further embodiments, a combination of uplink and downlink communications may be used including, for example, an iterative process where the downlink communication allows for a coarse position estimate of the device and a subsequent uplink communication allows for a more fine position estimate of the device.

In an embodiment, the method may include analyzing a plurality of received signals to determine if the received signals are valid. The analyzing may include measuring an angle of arrival of the plurality of received signals. Furthermore, the analyzing may include measuring a reference signal of the data communication corresponding to the received signal.

In an embodiment, the data communication may include a data payload independent of any location function of the signal. Thus, the communication array may include components of a data network for use in communication of the data payload (e.g., in a traditional IP communication using TCP/IP over an Ethernet or wide area network such as the internet, a cellular network such as an LTE network or the like), or over some other wired or wireless data communication network.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
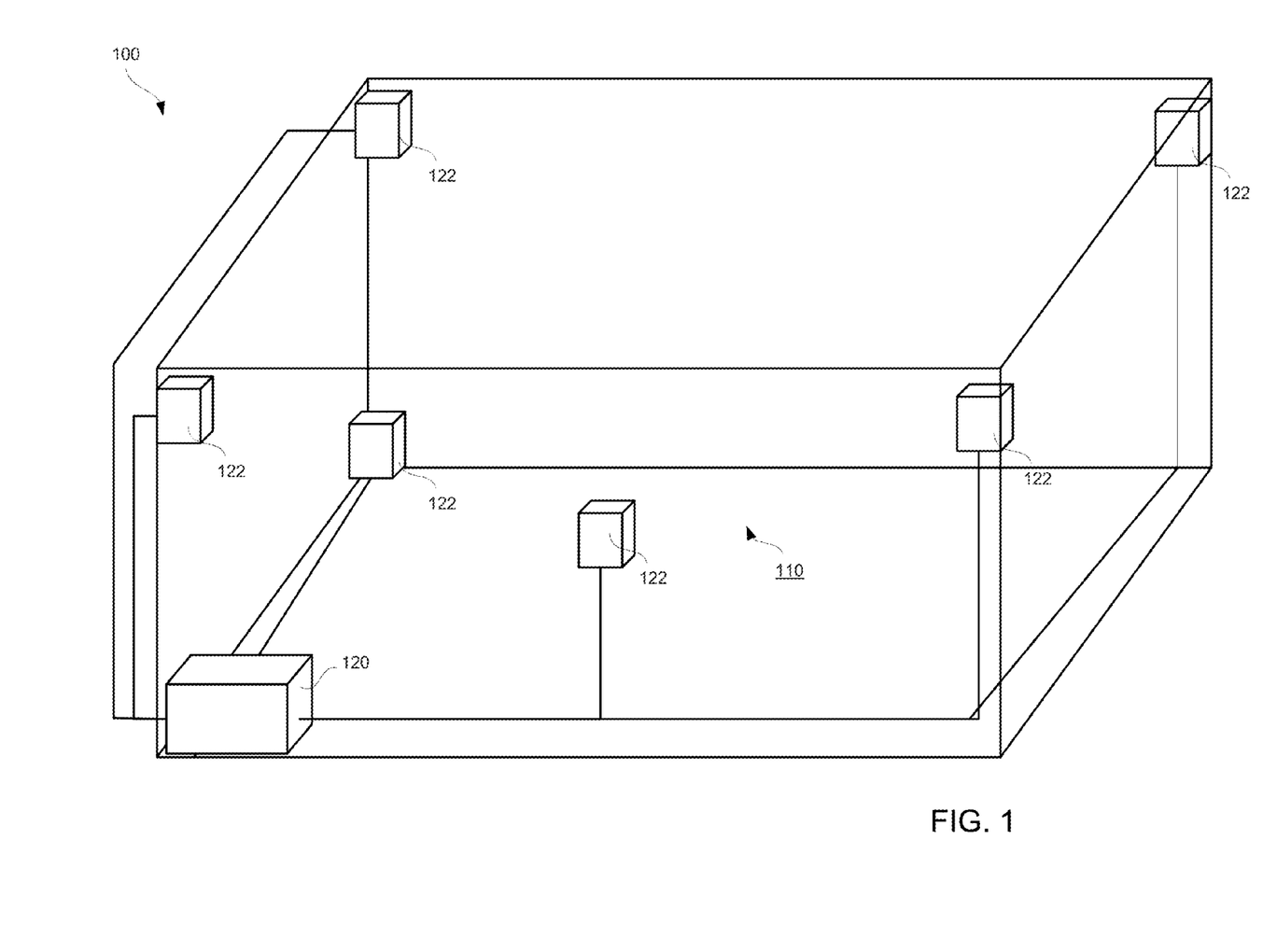
FIG. 1 is a schematic view of an embodiment of a system for locating a device in a monitored environment using a communication array synchronized over a packet switched communication network.

FIG. 1 depicts a system 100 that may be used in determining a location of a device 150 (not shown in FIG. 1) within a monitored environment 110. The system 100 may include a plurality of communication nodes 122 disposed throughout the monitored environment 110. The communication nodes 122 may comprise transceivers for receipt of a data communication originating within the monitored environment 110 and/or transmission of a data communication to the monitored environment 110. As may be appreciated from FIG. 1, the nodes 122 may be physically distributed with respect to the monitored environment 110 such that the monitored environment 110 may be defined by an area of overlapping communicability of at least two of the nodes 122. The nodes 122 are preferably distributed relative to the monitored environment to optimize performance relative to the monitored environment 110. For example, the nodes 122 may be located to minimize geometric dilution of precision as may be appreciated by those of skill in the art. A plurality of nodes 122 with overlapping communicability may be referred to herein collectively as an array. As may be appreciated, an array of communication nodes 122 may be operable to communicate with a device in the monitored environment 110, which may be utilized to locate the device within the monitored environment 110 relative to the array. The nodes 122 may comprise permanently affixed or located nodes 122 within the monitored environment 110 or may be temporarily deployed within the monitored environment 110.

In an embodiment, the monitored environment 110 may at least partially include an indoor environment. Accordingly, at least a portion of the monitored environment 110 may be otherwise difficult to obtain navigational signals such as GNSS signals (e.g. GPS) from a sufficient number of space vehicles to determine a location fix of a device located therein. In this regard, the disclosure contained herein may be utilized to assist in determining a location of the device 150 that may otherwise be unable to determine a location within the monitored environment 110 by way of traditional GNSS processing. Additionally, the present disclosure may be used in conjunction with GNSS or other location determination method to provide more accurate location determinations relative to a monitored environment 110. In other embodiments, the monitored environment 110 may be exclusively in an outdoor environment or may include a mixture of indoor and outdoor environments throughout which the array of nodes 122 may be disposed. In various embodiments, the monitored environment 110 may correspond to an area roughly between 5,000 and 50,000 square feet, although larger and/or smaller monitored areas 110 are contemplated.

The nodes 122 may be in operative communication with a central hub 120. The central hub 120 may be disposed within the monitored environment 110 as shown in FIG. 1 or the central hub 120 may be disposed remotely from the monitored environment 110 (e.g., such that the central hub 120 is in operative communication with the nodes 122 by way of a wide area network as will be described in greater detail below). In any regard, the central hub 120 may be in operative communication with the nodes 122 by way of a packet switch network interface whereby the central hub 120 and the nodes 122 communicate by exchanged data packets transmitted over the network. As may be appreciated, such packet switched network may utilize any appropriate protocol (e.g., any IP protocol such as, for example, TCP/IP, UDP/IP, or the like) to facilitate packet-based communication between the nodes 122 and the central hub 120.

In addition, the central hub 120 may communicate with the nodes 122 by any communication media known in the art. For example, the central hub 120 may be in operative communication with the nodes 122 over a wired interface (such as twisted pair conductor connection, a fiber optic connection, etc.) or a wireless interface (such as IEEE 802.11 connection, a Bluetooth connection, an infrared (IR) connection, a cellular data connection, a near field communication (NFC) connection, a WiMAX connection, other appropriate radiofrequency (RF) connection, or the like).

Figure 2:
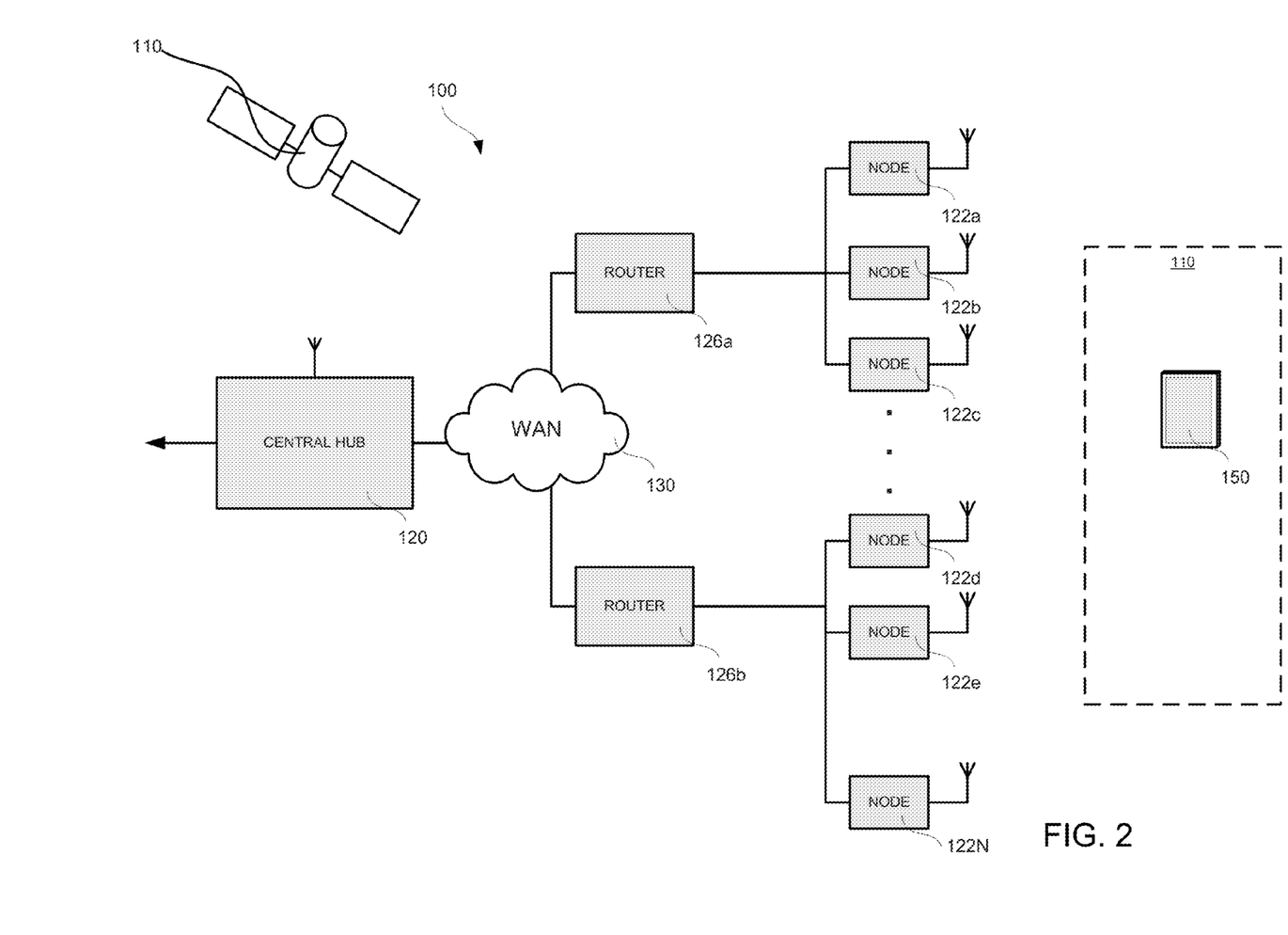
FIG. 2 is a schematic view of an embodiment of a network configuration for a system for locating a device in a monitored environment using communication arrays synchronized over the network.

With further reference to FIG. 2, a network schematic of an embodiment of a system 100 is depicted. As may be appreciated, the system 100 may include a plurality of nodes 122a, 122b, 122c, 122d, 122e, . . . 122N. In this regard, the system 100 may have at least two and up to N number of total nodes 122 that may be distributed throughout a monitored environment 110. The nodes 122 may each be in operative communication with a router 126 for facilitating packetized communication to and from the nodes 122 by way of a packet switched network. The router 126 may include hubs, switches, and/or other compoentry to facilitate communication between the nodes 122 and a local area network defined by the router 126 and/or a wide area network 130 (e.g., the Internet). As shown in FIG. 2, more than one router 126a and 126b may be provided. In this regard, nodes 122a, 122b, and 122c may be in operative communication with a first router 126a, while nodes 122d, 122e, . . . 122N may be in operative communication with a second router 126b. In this regard, all nodes 122 may be part of a common communication array, yet may be members of different local area networks (LANs). That is, router 126a may define a first LAN that includes nodes 122a, 122b, and 122c. Router 126b may define a second LAN that includes 122d, 122e, . . . 122N.

As described above, each router 126a and 126b may also facilitate communication with a wide area network 130. The central hub 120 may be in operative communication with the wide area network 130 such that communication between the local area networks defined by each router 126a and 126b are also in communication with the central hub 120 via the wide area network 130. It may be further appreciated that the nodes 122 may each be on a common local area network that may be in direct communication with the central hub 120 by way of a network switch, hub, or the like in lieu of a router 126. While two LANs defined by routers 126a and 126b are depicted in FIG. 2, it may be that additional LANs may be utilized in a similar regard as described above.

The central hub 120 may be in operative communication with the nodes 122 to synchronize the nodes 122 to a common time base. That is, the central hub 120 may have a local clock that may be driven by a local oscillator. Additionally, each node 122 may include a local clock driven by a local oscillator. As is common, local oscillators may be subject to errors in the form of frequency drift or the like. Each oscillator may experience random drift, thus resulting in clock differences between modules absent synchronization or the use of highly cost prohibitive oscillators. In turn, the central hub 120 is operative to communicate a synchronization communication to each node 122. Each node 122 may synchronize a local clock at the node 122 to the common time base using the synchronization communication. The synchronization communication may comprise a synchronization protocol (e.g., a proprietary communication protocol) that allows for precise synchronization of the local clocks of the various components of the system 100 (e.g., to less than about 100 ns). In an embodiment such as one where all nodes 122 are in communication over a single common LAN, the synchronization communication may utilize a Precision Time Protocol (PTP) as defined by IEEE standard 1588, the entirety of which is incorporated by reference in its entirety. In another embodiment where nodes 122 are in communication over a plurality of LANs or where a wide area network 130 is utilized to facilitate communication, a method for synchronization over an asynchronous, packet switched communication network as described in U.S. Pat. No. 7,961,717, which is incorporated by reference in its entirety, may be utilized.

In any regard, each node 122 may be synchronized to the common time base. The common time base may be a local time base that is common to the central hub 120 and each node 122. The time base may not be an absolute time reference, but may be common to each component in the system 100. That is, the time base may be common to all nodes 122 and the central hub 120 but may or may not be in synch with a remote time reference external to the system 100. In another embodiment, the system 100 may include a component equipped with a GNSS receiver (e.g., the central hub 120 as shown in FIG. 2) that is capable of deriving an absolute time base such as GPS time or the like. As such, the common time base may be aligned with an external or absolute time reference, but need not be in all embodiments. Additionally, the GNSS receiver may provide an absolute position reference relative to the system as will be described in greater detail below.

Figure 3:
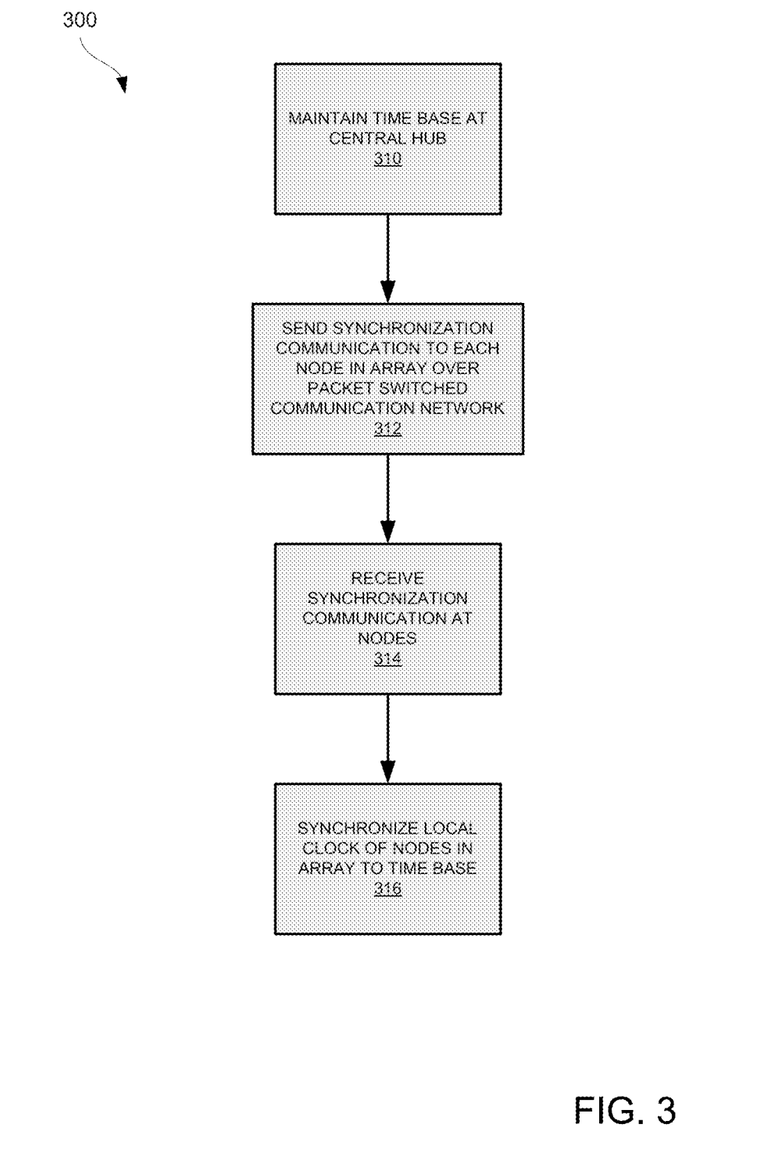
FIG. 3 is a flow chart depicting an embodiment of a method for synchronization of a communication array over a packet switched communication network.

Thus, with additional reference to FIG. 3, an embodiment of a method 300 for synchronization of nodes 122 in a system 100 to a common time base is shown. The method 300 may include maintaining 310 a common time base at the central hub 120. The method 300 may further include sending 312 a synchronization communication to each node in the array over a packet switched communication network 312. The method 300 may further include receiving 314 the synchronization communication at a node 122 in the array. In turn, the method 300 may include synchronizing 316 the local clock at a node 122 to the common time base. As such, the synchronizing may include analyzing the synchronization communication and/or characteristics derived from the communication of the synchronization communication over a network from the central hub 120 to a node 122 to derive synchronization instructions at the node 122. The synchronizing 316 may include modifying the phase of a local clock at the node (i.e., shifting the local time maintained to align to the time base) and/or modifying a frequency of a local oscillator to align the frequency of the local oscillator to the frequency of the time base (e.g., using a voltage controlled oscillator or the like).

Figure 4:
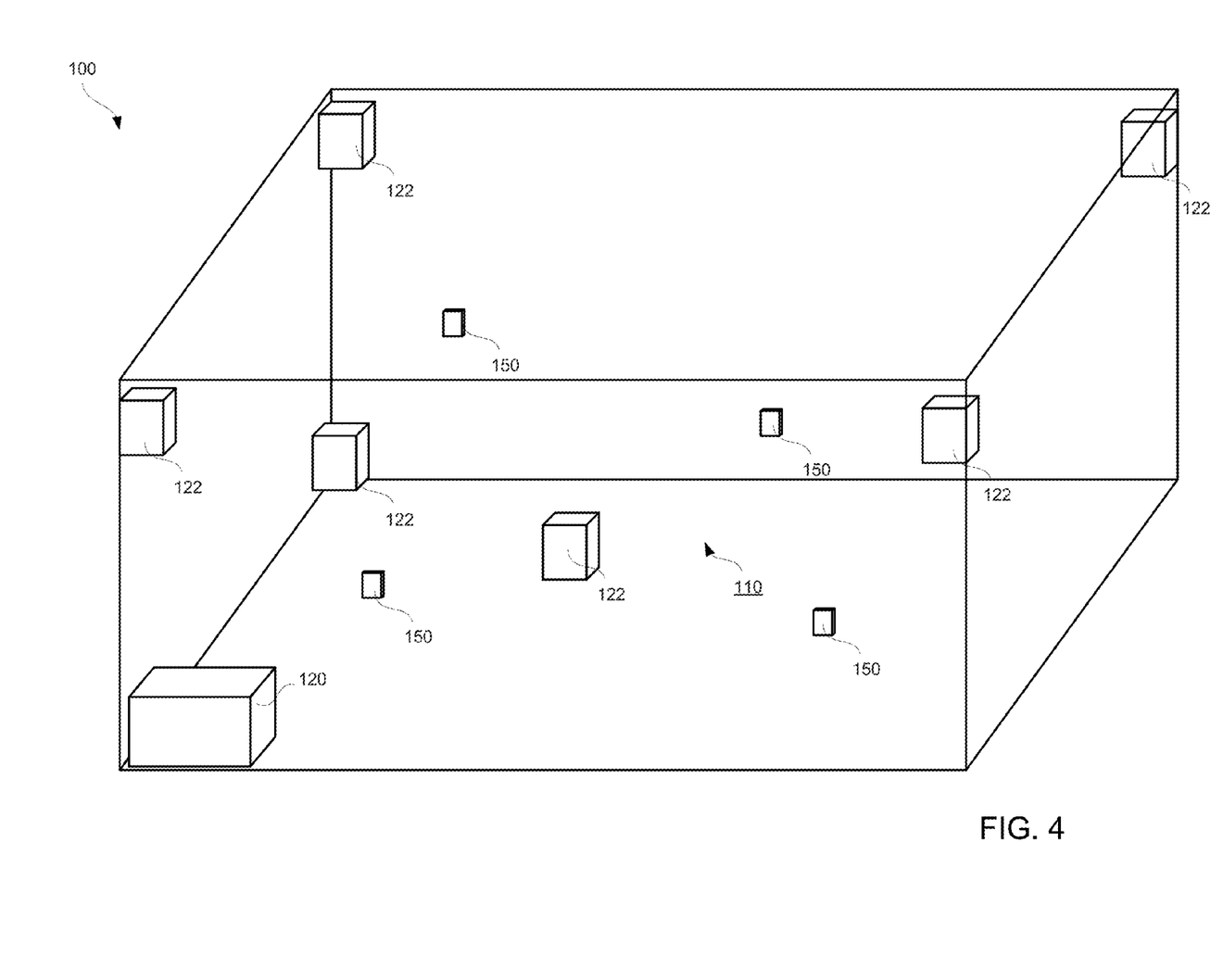
FIG. 4 is a schematic view of the monitored environment of FIG. 1 with a plurality of devices to be located within the monitored environment.

With additional reference to FIG. 4 (where depiction of communication links between each node 122 and the central hub 120 have been omitted to preserve clarity), one or more devices 150 may be located within the monitored environment 110. The devices 150 may correspond to non-stationary (i.e., mobile) devices whose positions may change within the monitored environment. In this regard, the devices 150 may comprise cellular telephones, smart phones, tablet computing devices, laptop computing devices, vehicles, or any other hardware that may include the ability to communicate with the communication array in a manner described below. Each device 150 may have a unique identifier, which may in turn be communicated to the array. As such, each device 150 may be uniquely located within the monitored environment 150. For example, certain ones of the mobile devices 150 may located to a precision level greater than other mobile devices 150. Furthermore, the frequency at which a location for a device 150 is determined may differ for different ones. That is, the location for one or more device 150 may be determined more frequently than other devices 150 in the monitored environment 110.

As will be described in greater detail below, the present disclosure contemplates locating a device 150 within a monitored environment 110. Specifically, the device 150 may be located using communication between a communication array disposed relative to the monitored environment 110 and the device 150 to be located. That is, wireless communication between the device 150 and the array may be measured such that characteristics of the communication between the device 150 and a plurality of nodes 122 may be used to determine the location of the device 150. Importantly, the communication between the array and the device 150 may comprise uplink (i.e., device to array), downlink (i.e., array to device), and/or a combination of uplink and downlink communication as will be described in greater detail below.

Figure 5:
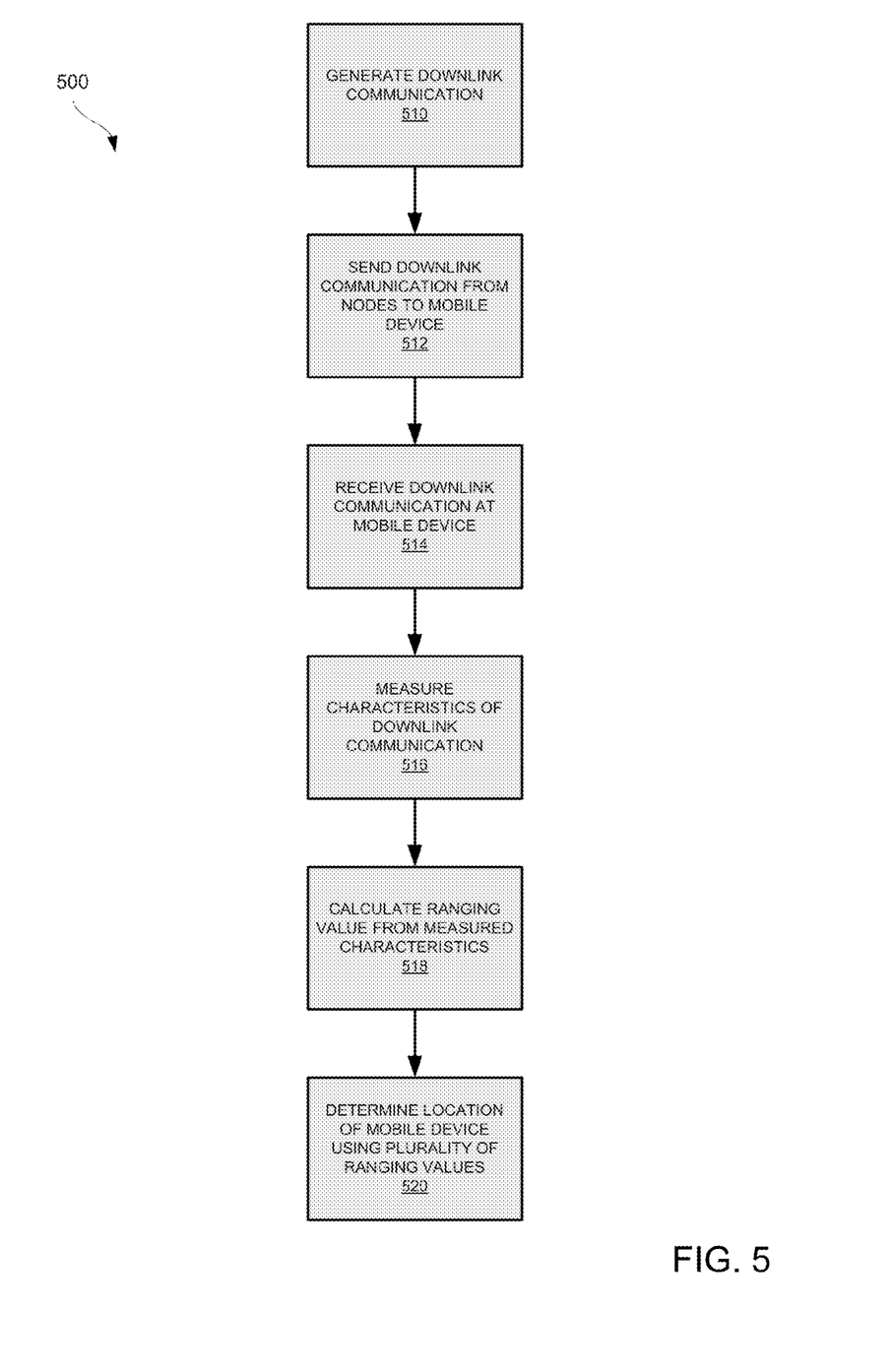
FIG. 5 is a flow chart depicting an embodiment of a method for determination of a device location in a monitored environment at least partially based on a downlink communication from a communication array to the device in the monitored environment.

Turning to FIG. 5, an embodiment of a method 500 for location of devices 150 in a monitored environment 110 is shown that utilizes downlink communication from an array of nodes 122 to a device 150 to be located. In this regard, the method 500 may include generating 510 a downlink communication. A downlink communication 510 may be generated at each node 122. In this regard, the downlink communication 510 may provide the capability to identify the source of the communication. As such, the node 122 in the array from which a downlink communication is received may be identified in the communication or by a property of the communication. Accordingly, the downlink communication may comprise a node identifier contained within the communication and/or may have one or more characteristics associated with the communication that may identify the source node 122 such as, for example, a uniquely coded, time-offset or frequency-offset signal associated with each node 122 may be utilized to identify the source of the downlink communication.

The method 500 may include sending 512 the downlink communication from a plurality of nodes 122 in the array to the device 150. The sending 512 may include simultaneously sending 512 a downlink communication from a plurality of nodes 122 or may include sending 512 downlink communications from different nodes 122 at offset times (e.g., which may connote an identity of the source node 122 of the signal). In any regard, the downlink communication 132 may include a time stamp corresponding to the time at which it was sent by a node 122 or be sent according to a known sending schedule that is maintained and may be further referenceable in the method 500 as described in greater detail below. In turn, the method may include receiving 514 the downlink communications from the plurality of nodes at the device 150. The method 500 may include measuring 516 a characteristic of the downlink communication from each node 122 to the device 150 based on the common time base. Examples of measured characteristics may include a time of flight of the communication between a node 122 and the device 150, an angle of arrival of the communication at the device 150, a phase of arrival of the communication at the device 150, or other appropriate characteristic of the communication.

For example, using a measured time of flight of the communication, the measuring 516 may include determining a first time relative to the common time base at which the downlink communication was sent from a node 122 (e.g., based on a time stamp included with the downlink communication and/or referenced from a sending schedule) and a second time relative to the common time base at which the downlink communication was received at the device 150. As such, the device 150 may receive synchronization information (e.g., with the downlink communication) that may provide information regarding the time base. The time of sending and time of receipt may be compared to measure 516 the time of flight of the communication. Additionally or alternatively, a TDOA approach may be used where the device 150 may not need to have access to or be synchronized with the common time base, but may rather use relative measures of the time different ones of the communications were received at the device 150.

In turn, the method 500 may include calculating 518 ranging values based on the measured 516 characteristic of the communication between the nodes 122 and the device 150. In the context of a measured time of flight, the ranging values may be calculated 518 as the speed of the communication may be assumed to be the speed of light. In turn, the time of flight measured 516 may be multiplied by the speed of light to determine a ranging value representative of the measured distance between a node 122 and the device 150. In this regard, the ranging value may be similar to a calculated pseudorange as is commonly utilized in GPS or other GNSS approaches.

Once the ranging values from a plurality of nodes 122 to the device 150 has been calculated 518, the method 500 may include determining 520 the location of the device using the ranging values. That is, once ranging values representing a measured distance between a corresponding plurality of nodes 122 and the device have been measured, the method 500 may determine 520 the location of the device by, for example, multilateration or other known navigational technique known in the art. Any one or more of the plurality of techniques may be employed in the determining 520 location of the device. For example, time of arrival (TOA), time difference of arrival (TDOA), angle of arrival (AOA), a radiofrequency (RF) phase of arrival (POA), or other known approaches useful in location determination may be performed. Thus, for example, triangulation or other known approaches of location determination calculations may be employed without limitation.

Figure 6:
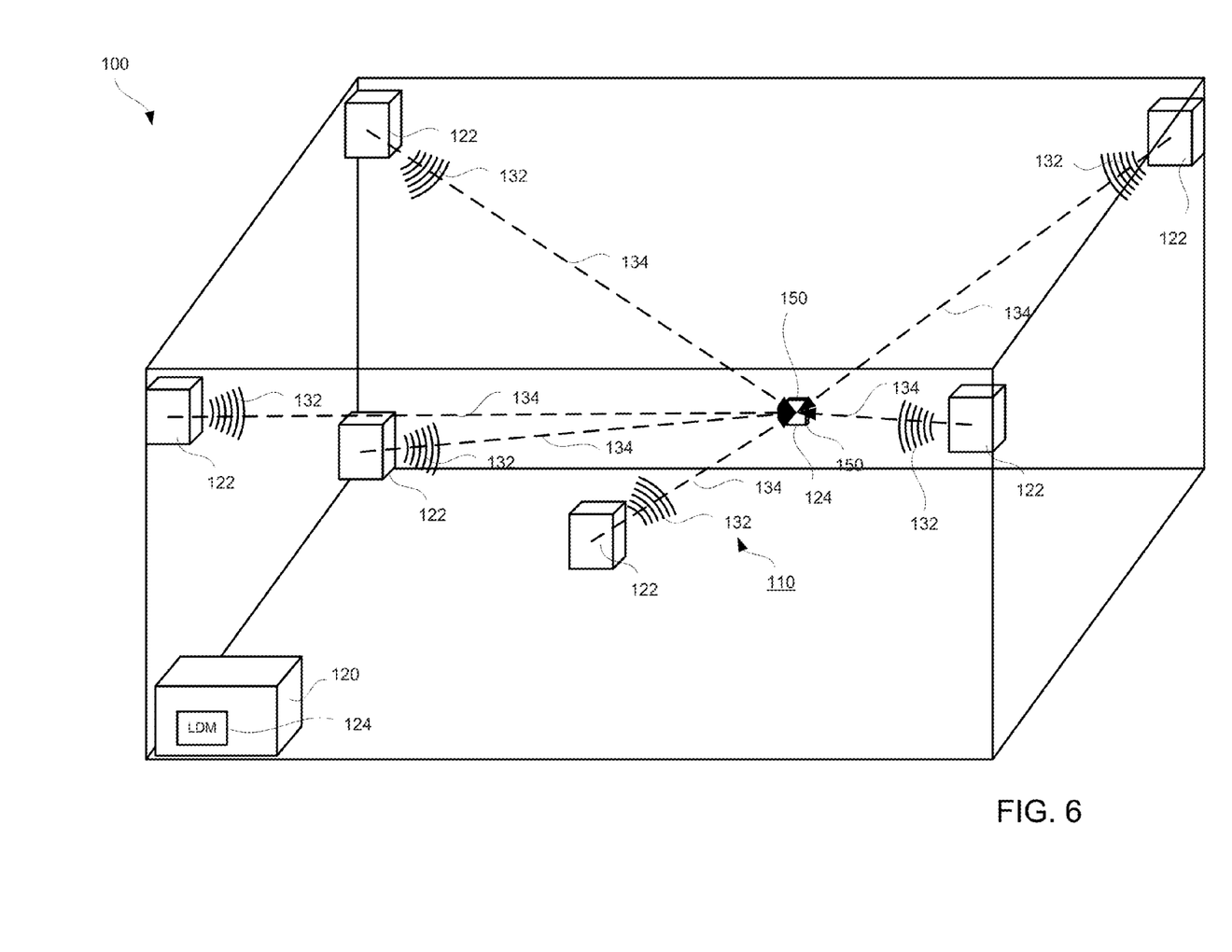
FIG. 6 is a schematic view of an embodiment of a monitored environment during location of a device in the monitored environment using a downlink communication from a communication array to a device in the monitored environment.

FIG. 6 schematically represents the operation of the system 100 when locating a device 150 using a downlink communication. In this regard, each node 122 may transmit a downlink communication 132 that is received at the device 150. In turn, a ranging value 134 may be calculated between the device 150 and each node 122 from which the device 150 receives a downlink communication 132. In the embodiment shown in FIG. 6, the device 150 may include a location determination module 124 that is operative to perform one or more of the measuring 516, the calculating 518, and/or the determining 520 of method 500. Additionally or alternatively, the central hub 120 may include a location determination module 124 operative to perform one or more of the measuring 516, calculating 518, or determining 520. Further still, different ones of the steps 516-520 may be performed in different respective locations such as a location determination module remote from both the central hub 120 and the device 150.

In an embodiment, the device 150 may receive the downlink communications 132 and time stamp the receipt of each respective communication 132. In turn, the device 150 may send the time stamps when each downlink communication 132 was received to the central hub 120 (e.g., by way of one or more nodes 122). When sending the time stamps, the time stamps may be associated with reach respective node 122 from which the downlink communication 132 was received (e.g., using a node identifier as discussed above). The central hub 120 may have access to data corresponding to when each downlink communication 132 was sent to the device 120 for purposes of measuring 516 the time of flight between each respective node 122 and the device 150. In turn, the central hub 120 may calculate 518 the ranging values. The central hub 120 may also be aware, have access to, or otherwise be provided with location information regarding each node 122. The location information for each node 122, in combination with the ranging values may allow for mulitlateration of the position of the device 150. In an embodiment where the device 150 comprises a location determination module 124, the device 150 may similarly be aware of, have access to, or otherwise be provided with location information regarding each node 122. For instance, such information may be contained in the downlink communication 132. In this case, the device 150 may communicate its location once determined 520 (e.g., to the central hub 120 or other remote device).

Figure 7:
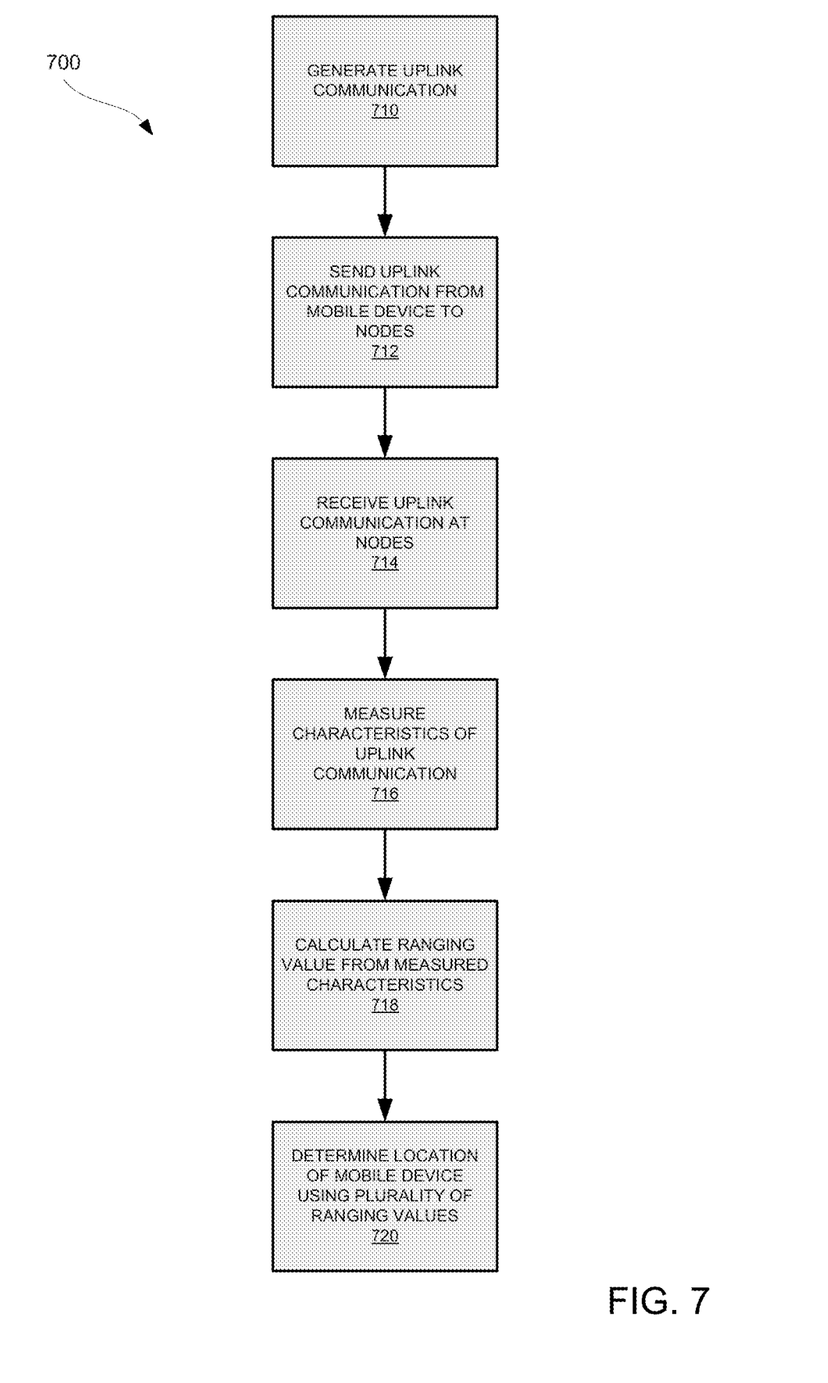
FIG. 7 is a flow chart depicting an embodiment of a method for determination of a device location in a monitored environment at least partially based on an uplink communication from the device in the monitored environment to a communication array.

With reference to FIG. 7, an embodiment of a method 700 for determining a location of a device 150 in a monitored environment 110 is shown that utilizes an uplink communication (i.e., device 150 to node 122). In this regard, the method 700 may include generating 710 an uplink communication. The method 700 may also include sending 712 the uplink communication from the device 152 a plurality of nodes 122. The sending 712 may include transmitting the uplink communication from the device 150 such that a plurality of nodes 122 are capable of receiving the uplink communication. As may be appreciated, given that the uplink communication is sent 712 simultaneously to a plurality of nodes 122, a common sending timestamp may be attributed or assumed for the sending 712 of the uplink communication for all nodes 122. In this regard, the method 700 may include receiving 714 the uplink communication in a plurality of nodes 122.

The method 700, like the method 500 described above, may include measuring 716 a characteristic of the transmission of the uplink communication 716 from the device 152 plurality of nodes 122. For example, the measured characteristic may include one or more of a time of flight of the communication, an angle of arrival of the communication, an RF phase of arrival of the communication, etc. In this regard and in the context of a measured time of flight, the method 700 may include calculating 718 plurality of ranging values corresponding to a measured distance from the device 150 to each of the plurality of nodes 122 based on the measured time of flight. The ranging values may be in turn used to determine 720 the location of the device 150 relative to the plurality of nodes 122 (e.g., using multilateration or the like as described above in the context of a downlink communication). As described above with respect to the method 500, the measuring 716, calculating 718, and/or determining 720 steps may be performed at one or more different locations. For example, the nodes 122, after receiving 714 the uplink communication, may forward the uplink communication and/or information related thereto to the central hub 120 for processing. As such, the central hub 120 may include a location determination module 124 operative to perform the measuring 716, calculating 718, and determining 720 steps. However, one or more steps of such processing may alternatively be performed at one or more different remote location determination modules.

Figure 8:
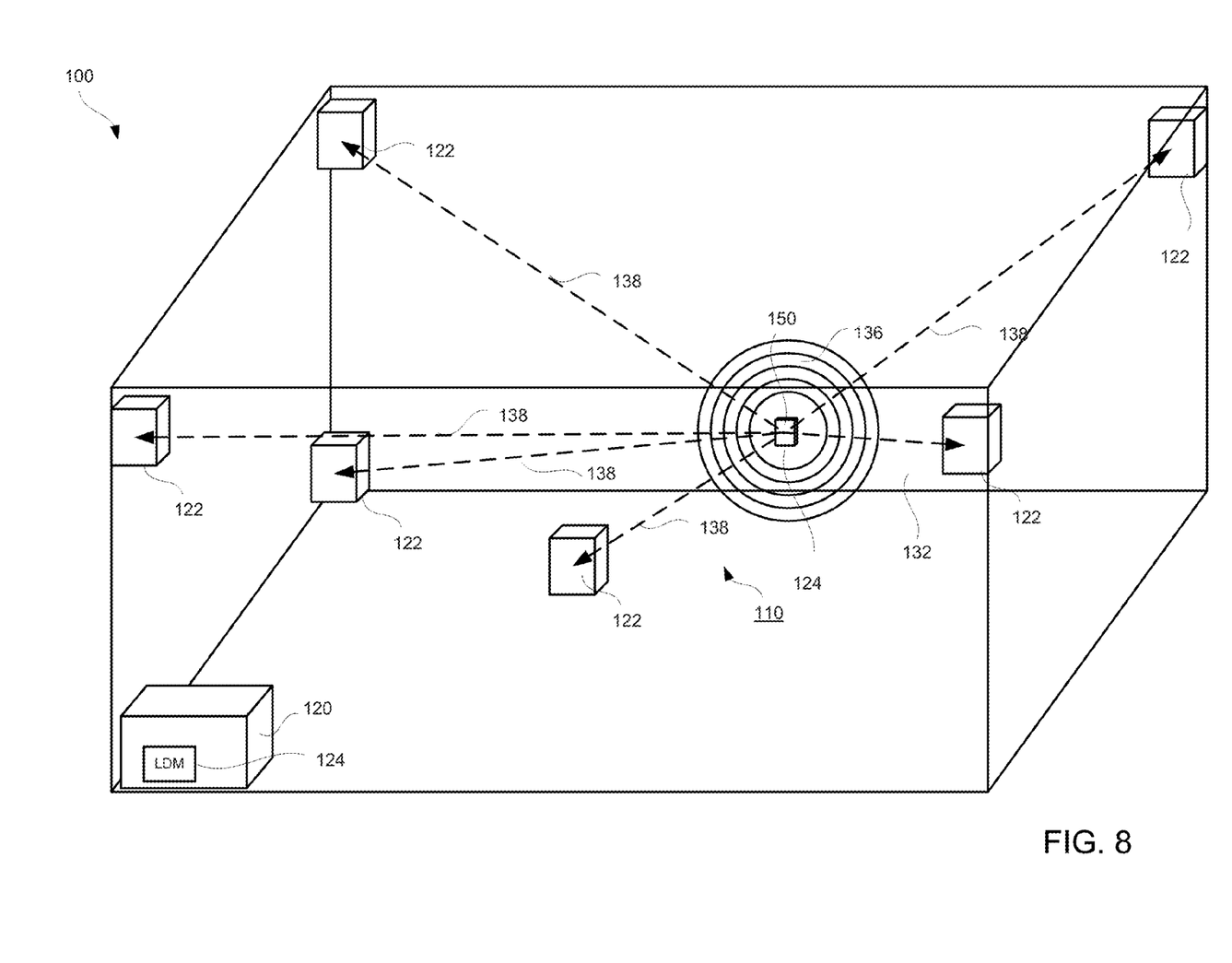
FIG. 8 is a schematic view of an embodiment of a monitored environment during location of a device in the monitored environment using an uplink communication from the device in the monitored environment to a communication array.

With further reference to FIG. 8, a schematic view depicting an embodiment of a system 100 utilizing an uplink communication 136 for purposes of determining a location of a device 150 in a monitored environment 110 is depicted. The device 150 may send an uplink communication 136. The uplink communication 136 may be received by plurality of nodes 122. In turn, a plurality of ranging values 138 may be calculated using a measured time of flight of the uplink communication 136 from the device 150 to the plurality of nodes 122. As described above in relation to FIG. 6, the measurement of the time of flight, the calculation of the ranging values, the determination of the location of mobile device 150 may be performed at a location determination module 124 resident at the device 150 and/or at a location determination module 124 resident at the central hub 120 and/or at a different remote location. As can be appreciated in FIG. 8, the uplink communication 136 may be simultaneously broadcast in an omnidirectional fashion such that a plurality of nodes 122 may receive a single uplink communication 136 transmitted from the device 150.

Figure 9:
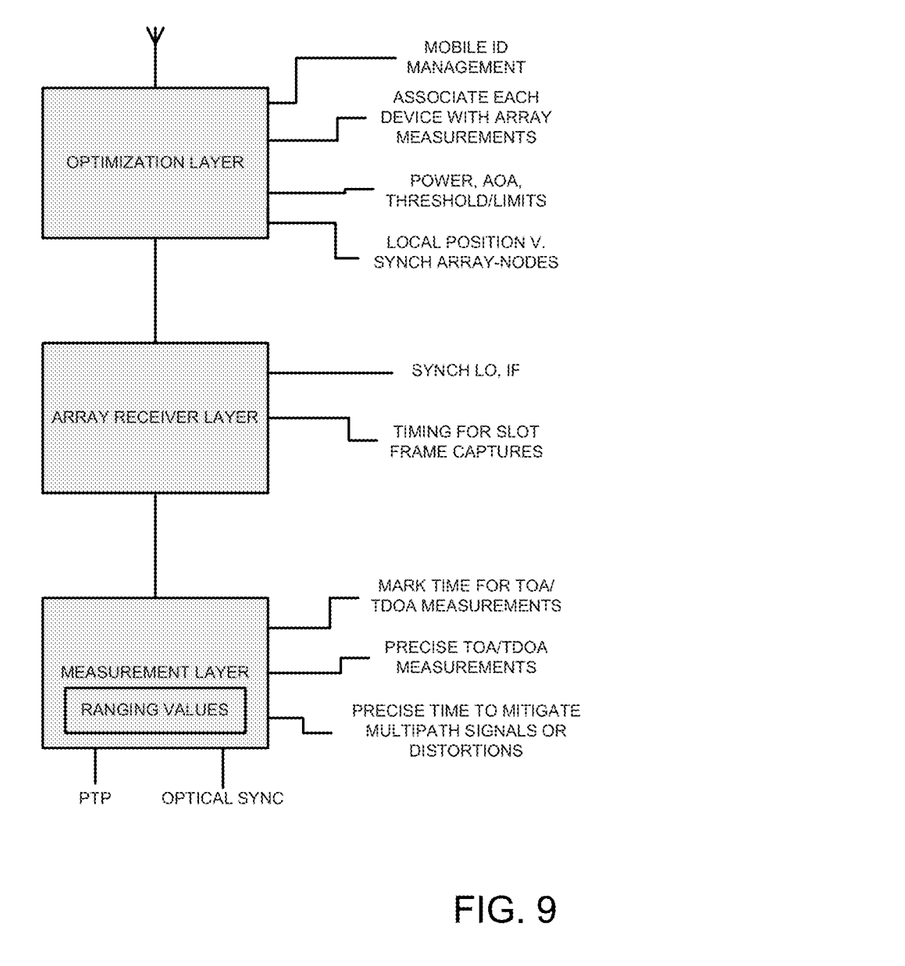
FIG. 9 is a schematic representation of the operation of a system for locating a device in a monitored environment.

FIG. 9 depicts a representation of data flow in an embodiment of a system 100. In this regard, a measurement layer may be provided. As appreciated from the foregoing, the measurement layer may receive a synchronization signal such as a PTP or an optical synchronization signal. Furthermore, the measurement layer may receive time stamps (i.e., mark times) for TOA/TDOA or other time of sending or time of receipt events. Further still, in the context of an RF phase of arrival approach, the measured phase of a signal at receipt may be determined at the measurement layer. In turn, the measurement layer may receive precise timing measurements for use in TOA, TDOA, phase difference of arrival, or other appropriate processes.

In turn, the data received and/or processed at the measurement layer may be provided to an array receiver layer. The array receiver layer may be provided with data corresponding to timing for slot frame captures. In turn, the array receiver layer may process the measured values from the measurement layer to determine the time of arrival relative to the common time base. In this regard, a reference to the common time base may be provided to the array receiver layer. Additionally, in the context where phase of arrival is utilized, a reference oscillator may provide data to the array receiver layer such that the measured phase of a communication received from the measurement layer may be used to relative to the reference oscillator.

Furthermore, the data flow may include an optimization layer. The optimization layer may include mobile device ID management (e.g., for specifying behavior of the system with respect to specific ones of a plurality of devices 150 located within a monitored environment 110 as discussed above in relation to FIG. 4). The optimization layer may further receive data to associate each device 150 with measurements received from the measurement layer and/or data received from the array receiver layer. The optimization layer may also receive data for assistance in discriminating valid signals from invalid signals using, for example, power thresholds and/or angle of arrival values.

While the foregoing has described device 150 location by either an uplink or downlink process, it may be further appreciated that an iterative process may be utilized that employs both uplink communications and downlink communications between an array and a device 150 be located. For instance, in one embodiment downlink communications between nodes 122 and a device 150 may be sent at a first time to achieve a coarse positioning of the device 150 within the monitored environment 110. Thereafter, an uplink communication at a second time from the device 150 to the array may be made. In turn, the system 100 may utilize the coarse positioning of the device 150 determined during the downlink communication in combination with the uplink communication to determine a fine position of the device 150 within the monitored environment 110, where the fine position is more precise than the coarse positioning determined during the downlink communication. For example, this iterative approach may facilitate use of phase of arrival processing of the uplink communication more accurately determine a location of the device 150 a monitored environment 110. In this regard, phase arrival processing may require a rough course estimation of the location of a device 150 that may be utilized in conjunction with known phase modulation of the uplink signal relative to the nodes 122 receiving communication from the device 150 to provide more accurate location of the device 150 within the monitored environment 110.

Additionally, the communication nodes 122 may include functionality to resolve target signals received from devices 150 within the monitored environment 110 such that the communication nodes 122 may be able to reject or ignore signals that do not correspond with signal sent from a device 150. That is, the nodes 122 may scrutinize signal properties to determine valid signals from invalid signals. Examples of invalid signals may include signals originating a devices 150 outside of the monitored environment 150, unwanted signal effects such as multipath signaling or signal echoes from devices 150 within the monitor environment 150, and/or other undesired signals that cannot correspond to signals from a device 150 be located within the monitored environment 110. In an embodiment, the nodes 122 may be equipped with hardware and/or software to facilitate angle of arrival processing receive signal from within the monitor environment 110. The angle of arrival processing may be utilized to scrutinize received signals to determine whether a signal received at the node 122 is valid for purposes of locating a device 150 within the monitored environment 110. The angle of arrival of a signal may also be used in conjunction with at least one other receiving node 122 to determine the location of a device 150 based on the measured angles of arrival at the at least two nodes 122. In still further environment, a signal received from within the monitor environment may include a reference signal the may be utilized to assist in discriminating useful signals from unuseful or unwanted signals. In this regard, the uplink communication may include a reference signal the may be proprietary protocol used by a node 122, central hub 120, and/or location determination module 124 and the processing of a signal. In another embodiment, the reference signal may include a standardized signal such as the Sounding Reference Signal (SRS) protocol that has been proposed in future releases of long-term evolution protocols (LTE). In any regard, the reference signal may be scrutinized by the system 100 (e.g. amplitude may be measured) to enhance accuracy and discriminate slightly delayed echoes or multipath energy from the most direct signal received from a device 150.

It may also be appreciated that the uplink and/or downlink communications between a device to be located 150 and the array of nodes 122 may include data communications provided in addition to data used in the determination of the location of the device 150. For example, the nodes 122, central hub 120, and other related network componentry may comprise hardware for use in a traditional data network such as a Wi-Fi network, a cellular data network, or other data network. Accordingly, the uplink and downlink communications may include data packets useful for transmitting data between the device 150 and other devices in communication with the device 150 by way of a wide-area network 130 at the like. That is, the data communication exchanged by the nodes 122 and the device 150 may have a data payload independent of any location function of the signal. In this regard, all data associated with the location determination of a device 150 in the monitored environment 110 may include metadata appended to the otherwise exchanged data packets between the device 150 and another device (e.g., data contained in headers of data packets exchanged in accord with a data protocol such as TCP/IP). In other embodiments, the communications between the array of nodes 122 and the device 150 may be a standalone approach to location determination of the module 150 such that any communications between the array of nodes 122 and the device 150 may be dedicated solely to the determination of the location of the device 150.

As may be appreciated, the system 100 and described above may be useful in a variety of environments in a variety of applications. Although not limited in this respect, particular advantages may be provided in indoor environments or partially indoor environments where an array of nodes 122 may be readily deployed and alternate positioning systems may be unavailable, insufficiently accurate, or have undesirably long times to location fix. For example, the system may be used to monitor and/or track individuals, equipment, or products within the monitored environment 110. The positions resulted into the foregoing disclosure may be also correlated to floor plans, maps, points/geofenced zones of interest, geo-referenced data, or the like. As such, in an embodiment where the system 100 includes a GNSS receiver, an absolute position may be attributed to the system 100 as a whole and/or use to provide supplemental absolute positioning information of a located device 150. Any such correlation between a monitored environment 110 and an absolute location may be based on empirical evidence or other theoretical basis. For instance, such external references such as floor plans, maps, or the like may also be used in position determination, such as, to eliminate possible position solutions and/or filter multipath noise. Furthermore, various analytics may be employed based on continuous or periodic (e.g. sporadic) position determinations such as determining total traffic a location of his own, well time of an individual the location of interest, throughput of individuals, equipment, products, etc.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A system for determining a location of a mobile device in a monitored indoor environment, the system comprising:
   a plurality of communication nodes distributed within the monitored indoor environment that define a communication array, wherein each of the plurality of communication nodes in the communication array is in operative communication with at least one mobile device for a data communication between the communication array and the mobile device, and wherein the plurality of communication nodes are disposed in known locations in the monitored indoor environment relative to a descriptor regarding the indoor environment;
   a central hub in operative communication with the communication array by way of an asynchronous packet switched communication network, the central hub providing a synchronization communication to the communication array over the asynchronous packet switched communication network for synchronization of each of the plurality of communication nodes of the communication array to a common time base based on characteristics derived from the synchronization communication over the asynchronous packet switched commination network; and
   a location determination module that is operative to determine the location of the mobile device within the monitored indoor environment relative to the communication array using at least the common time base and the data communication including, characteristic derived from the data communication comprising at least one of a time of arrival or a time difference of arrival, wherein the location of the mobile device is resolved in relation to the descriptor regarding the indoor environment.

2. The system of claim 1, wherein the data communication comprises an identifier corresponding to a source from which the data communication is sent.

3. The system of claim 2, wherein the data communication comprises a downlink communication and the source comprises a communication node.

4. The system of claim 2, wherein the data communication comprises an uplink communication and the source comprises the mobile device.

5. The system of claim 2, wherein the location determination module is operative to calculate a plurality of ranging values, wherein each ranging value of the plurality of ranging values corresponds to a measured distance between the mobile device and a respective communication node of the plurality of communication nodes, wherein each said ranging value of the plurality of ranging values is at least partially based on a measured time of flight of the data communication between a communication node of the plurality of communication nodes and the mobile device.

6. The system of claim 5, wherein the location determination module is operative to calculate a position of the mobile device relative to the communication array based on the plurality of ranging values relative to the known locations of the plurality of communication nodes in the communication array.

7. The system of claim 6, wherein the location determination module is at a location remote from the mobile device.

8. The system of claim 7, wherein the central hub comprises the location determination module.

9. The system of claim 6, wherein the location determination module is remote from the central hub.

10. The system of claim 6, wherein the mobile device comprises the location determination module.

11. The system of claim 10, wherein the mobile device is operative to communicate the position of the mobile device to the central hub.

12. The system of claim 6, wherein the location determination module is disposed at the central hub, and wherein each communication array is operative to time stamp the receipt of an uplink communication relative to the common time base and communicate the time stamp and the identifier to the central hub.

13. The system of claim 12, wherein the location determination module at the central hub is operative to determine a pseudorange between the mobile device and each said communication node of the communication array at least partially based on the time stamp relative to the common time base and location information for the respective said communication node of the communication array.

14. The system of claim 1, wherein the communication array comprises at least a first communication node of a first local area network (LAN) and at least a second communication node of a second LAN, wherein the first LAN is different than the second LAN.

15. The system of claim 14, wherein the central hub is in communication with the first communication node and the second communication node by way of a wide area network.

16. The system of claim 1, wherein the data communication comprises network communication data independent of any specific location determination information.

17. The system of claim 16, wherein the data communication comprises a reference signal.

18. The system of claim 17, wherein the reference signal comprises a sounding reference signal (SRS).

19. The system of claim 17, wherein the location determination module is operable to analyze the reference signal to discriminate valid signals corresponding to the data communication from invalid signals not corresponding to the data communication.

20. The system of claim 1, wherein the plurality of communication nodes are physically distributed throughout the monitored indoor environment, and wherein the monitored indoor environment corresponds to an area of overlapping communicability of the communication nodes.

21. The system of claim 1, further comprising:
a GNSS receiver operative to provide a location reference for the system.

22. The system of claim 21, wherein the GNSS receiver provides a GNSS time reference to the central hub.

23. The system of claim 22, wherein the common time base comprises the GNSS time reference.

24. The system of claim 1, wherein the descriptor comprises at least one of a map, floor plan, or georeference data.

25. A method for determining a location of a mobile device in a monitored indoor environment, the method comprising:
synchronizing a plurality of communication nodes to a central time base maintained at a central hub based on characteristics derived from communication of a synchronization communication between the plurality of communication nodes and the central hub over an asynchronous packet switched communication network, wherein the plurality of communication nodes are distributed in known locations within the monitored indoor environment relative to a descriptor of the monitored indoor environment and collectively define a communication array;
communicating a data communication between the communication array and the mobile device;
measuring a characteristic of the data communication comprising at least one of a time of arrival or a time difference of arrival; and
determining the location of the mobile device within the monitored indoor environment in relation to the descriptor of the monitored indoor environment using at least the common time base and the characteristic of the data communication.

26. The method of claim 25, wherein the determining comprises calculating a plurality of ranging values corresponding to distances between respective ones of the plurality of communication nodes and the mobile device.

27. The method of claim 26, wherein the determining comprises multilateration using the plurality of ranging values.

28. The method of claim 25, wherein the data communication comprises a downlink communication, and wherein the communicating comprises sending the downlink communication from the plurality of communication nodes to the mobile device.

29. The method of claim 25, wherein the data communication comprises an uplink communication, and wherein the communicating comprises sending the uplink communication from the mobile device to the plurality of communication nodes.

30. The method of claim 25, further comprising:
analyzing a plurality of received signals to determine if the received signals are valid.

31. The method of claim 30, wherein the analyzing comprises measuring an angle of arrival of the plurality of received signals.

32. The method of claim 31, wherein the analyzing comprises measuring a reference signal of the data communication corresponding to the received signal.

33. The method of claim 25, wherein the data communication comprises a data payload independent of any location function of the signal.

* * * * *